United States Patent [19]

Vandenberg

[11] 3,928,501

[45] Dec. 23, 1975

[54] GRAFT POLYMERS OF HALO OXIRANE OR OXETANE ONTO HALO POLYMERIC BACKBONE

[75] Inventor: Edwin J. Vandenberg, Wilmington, Del.

[73] Assignee: Hercules Incorporated, Wilmington, Del.

[22] Filed: June 27, 1974

[21] Appl. No.: 483,856

[52] U.S. Cl. .................. 260/890; 260/33; 260/836; 260/837 R; 260/874; 260/887; 260/896; 260/897 C; 260/899
[51] Int. Cl.² .................... C08L 11/00; C08L 23/00
[58] Field of Search........ 260/890, 897 C, 896, 836, 260/837 R, 899, 874, 887, 3.3

[56] References Cited
UNITED STATES PATENTS

| | | | |
|---|---|---|---|
| 3,065,188 | 11/1962 | Vanderberg | 260/890 |
| 3,700,650 | 10/1972 | Hani et al. | 260/890 |
| 3,714,115 | 1/1973 | Jonnes | 260/890 |

*Primary Examiner*—Murray Tillman
*Assistant Examiner*—J. Ziegler
*Attorney, Agent, or Firm*—Hazel L. Deming

[57] ABSTRACT

Halogen-containing polymer backbone chains containing grafts of polyethers derived from halogen-substituted oxiranes or oxetanes are described. The graft polymers are produced by contacting polymers containing reactive halogen with halogen-substituted oxiranes or oxetanes in the presence of a catalytic amount of an organoaluminum compound which has been modified with water, boron trifluoride and/or phosphorus pentafluoride. The graft polymers are useful as such for films, fibers, coatings, etc., and are particularly useful for blending with other materials to provide special properties such as flame resistance, impact resistance, etc.

15 Claims, No Drawings

GRAFT POLYMERS OF HALO OXIRANE OR OXETANE ONTO HALO POLYMERIC BACKBONE

This invention relates to graft polymers and more particularly to halogen-containing polymers having polyethers grafted thereto and to a process for producing the same.

Halogen-containing polymers grafted with polymers of olefinic monomers such as styrene, isobutylene, chloroprene, etc., are described in British Patent 1,174,323 to Esso Research and Engineering Co., filed July 5, 1967 and published Dec. 17, 1969. Therein, polymers having reactive halogen functionality present as allylic, tertiary or benzylic halogen atoms are grafted by reacting the halogen-containing polymer such as, for example, poly(vinyl chloride), chlorobutyl rubber, etc., with trialkylaluminum or a dialkylaluminum halide or hydride and an olefinic monomer at −90° to +70°C. The process is said to give substantial yields of graft polymers with only moderate amounts of homopolymer formation and to provide graft polymers having properties which range from those of thermoplastic resins to elastomers depending upon such factors as the choice of the starting backbone material, the polymerizable monomer used, the backbone to graft ratios, etc. The grafting of polyethers from halogen-containing cyclic oxides onto halogen-containing polymer backbones, however, is not taught or suggested by British 1,174,323.

Now, in accordance with the present invention, it has been found that unique graft polymers can be produced by reacting halogen-substituted oxiranes or oxetanes with certain halogencontaining polymers in the presence of an organoaluminum compound which has been modified by reaction with water, boron trifluoride, phosphorus pentafluoride, water and boron trifluoride, water and phosphorus pentafluoride or water, boron trifluoride and phosphorus pentafluoride.

Accordingly, the present invention relates to graft polymers comprising a halogen-containing polymer backbone chain wherein at least 0.01 mole % of the units of the polymer chain contain at least one reactive halogen on a tertiary carbon atom or on a primary or secondary carbon atom alpha to an aromatic ring, to a carbon-to-carbon double bond or to a carbon-to-oxygen double bond, and wherein at least one reactive halogen has been replaced by a graft of a polyether derived from at least one halogen-substituted oxirane or oxetane, and to a process for producing such graft polymers by contacting said halogen-containing polymer with at least one halogen-substituted oxirane or oxetane in the presence of a catalytic amount of an organoaluminum compound which has been modified by reaction with at least one of the group consisting of water, boron trifluoride and phosphorus pentafluoride until at least one reactive halogen has been replaced by a graft of a polyether derived from said oxirane or oxetane.

Halogen-containing polymers suitable as the backbone for the grafting include any halogenated polymer, i.e. chlorinated, brominated, iodinated, or fluorinated polymer, in which at least 0.01 mole % of the units of the polymer contain at least one reactive halogen atom present on a tertiary carbon atom or on a primary or secondary carbon atom alpha to an aromatic ring, to a carbon-to-carbon double bond or to a carbon-to-oxygen double bond. By tertiary carbon atom is meant a carbon atom which is attached directly to three other carbon atoms; by primary carbon atom is meant a carbon atom which is attached directly to one other carbon atom and to two hydrogen atoms; and by secondary carbon atom is meant a carbon atom which is attached directly to two other carbon atoms and to one hydrogen atom. Groupings containing reactive halogen in the above-specified forms are graphically depicted below by the following general formulae wherein X, in each case, represents halogen and the free carbon bonds are attached to hydrogen or to carbon and at least one of the free bonds is attached to a unit of the polymer chain.

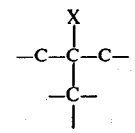

halogen on a tertiary carbon atom

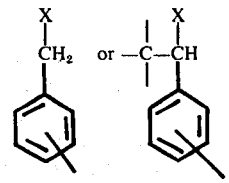

halogen on a primary or secondary carbon atom alpha to an aromatic ring (benzylic carbon)

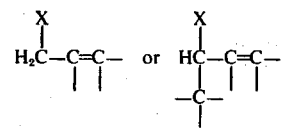

halogen on a primary or secondary carbon atom alpha to a carbon-to-carbon double bond (allylic carbon)

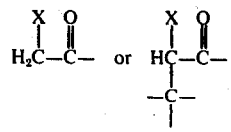

halogen on a primary or secondary carbon atom alpha to a keto group

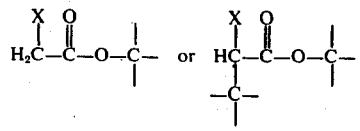

halogen on a primary or secondary carbon atom alpha to a keto ester group

The above formulae are not intended to be limiting and it is understood that more than one of the above forms of reactive halogen can be present in a given polymer. Thus, halogen can be present on a tertiary carbon atom of a benzylic or allylic group or a tertiary carbon which is alpha to a keto or to a keto ester group.

Polymers having halogen present in the above groupings can be prepared from appropriately halogenated monomers or the halogen functionality can be introduced, with any suitable postpolymerization technique. Thus, most hydrocarbon high polymers can be used as the backbone polymer for the synthesis after a suitable post-polymerization treatment. The starting polymers, however, should not usually contain large amounts of groups which tend to interfere with the catalytic activity of the modified organoaluminum compound. Generally, groups such as $-NH_2$, $-CONH_2$, $-OH$, $-COOH$ and $-SO_3H$ should not be present to any large extent. Hence, polymers such as polyamines, polyamides, poly(vinyl alcohol), poly(acrylic acid) and poly(vinyl sulfonic acid) containing introduced halogen functionality are not usually practical in the practice of this invention unless special conditions or techniques are employed. However, when the halogen-containing polymer is employed in insoluble form such as a film, fiber or dispersion in a diluent, and reactive halogens are present on the surface of the polymer, large amounts of groups which normally would tend to interfere with the catalyst activity can be tolerated without adverse effects.

Polymers which can be used as the backbone include polymers of the vinylidene halides such as poly(vinyl chloride), poly(vinylidene chloride), poly(vinyl bromide), poly(vinyl fluoride), copolymers of vinyl chloride or vinyl bromide with each other or with ethylene, propylene, etc.; polymers of tert.-haloalkyl monoolefins such as poly(4-chloro-4-methylpentene-1), poly(5-bromo-5-methylhexene-1), poly-(7-chloro-7-methyloctene-1), etc.; polymers of the α-haloacrylate esters such as the homopolymers and copolymers of α-chloro and α-bromoacrylate esters; polymers of the α-haloalkylaryl olefins such as homopolymers of the chloromethylstyrenes (ortho, meta and para), copolymers of the chloromethylstyrenes with each other, styrene, butadiene, chloroprene, etc., homo- and copolymers of the α-chloroalkyl-α'-methylstyrenes, homopolymers of p-chloromethylallylbenzene or 1-(pentenyl-4)-3'-chloromethylbenzene, copolymers of p-chloromethylallylbenzene with ethylene, propylene, etc.; polymers of the α-haloalkyl vinyl ketones such as the homopolymers of α-chloro or α-bromomethyl vinyl ketones, copolymers of α-chloromethyl vinyl ketone with α-bromomethyl vinyl ketone, butadiene, chloroprene, etc.; polymers of halo-dienes such as poly(1-chloro-1,3-butadiene), poly(2-chloromethyl-1,3-butadiene), poly(6-chloro-1,4-hexadiene), poly(8-chloro-1,6-octadiene) and polychloroprene; polymers of 1-haloalkylvinyl glycidyl ethers such as homopolymers of 1-chloromethylvinyl glycidyl ether or 1-[2(1-chloromethylvinylozy)-1-chloromethylethoxy]-2,3-epoxypropane and copolymers thereof with alkylene oxides such as ethylene oxide, propylene oxide, butylene oxide, styrene oxide, the epihalohydrins such as epichlorohydrin and epibromohydrin, allylglycidyl ethers, allyloxyalkyl glycidyl ethers, etc.; polymers of glycidyl haloalkanoates such as homopolymers of glycidyl chloroacetate and copolymers thereof with a second epoxide such as ethylene oxide, epichlorohydrin, etc., an oxetane, furan, etc.; and polymers of monoepoxides of halodienes, haloolefins or haloalkylarylolefins such as poly(1,2-epoxy-5-chloro-pentene-3), poly(1,2-epoxy-6-bromohexene-4), poly(cis-1,8-dichloro-4,5-epoxy-octadiene-2,5), poly(1,2-epoxy-4-chloro-4-methylpentane), poly(1,2-epoxy-5-bromo-5-methylhexane), poly(cis-4,5-epoxy-2,7-dichloro-2,7-dimethyloctane), poly(p-chloromethylstyrene oxide), poly(m-bromomethylstyrene oxide), poly(p-bromomethylallylbenzene epoxide) and poly[cis-1,2-bis(p-chloromethylphenyl)ethylene oxide]. Also useful are non-halogen-containing polymers which have been modified by post-halogenation to introduce functionality, for example, halogenated hydrocarbon polymers such as chlorobutyl rubber, chlorinated polyethylene, chlorinated polypropylene, chlorinated ethylene-propylene copolymers, chlorinated polystyrene, chlorinated or hydrochlorinated natural rubber, chlorinated or hydrochlorinated poly-cis-isoprene, chlorinated or hydrochlorinated poly-cis-butadiene, chlorinated or hydrochlorinated polypiperylene, hydrochlorinated butyl rubber, etc. Additional examples include polymers which have been modified by other post-polymerization treatments such as halomethylation, grafting, end-capping, etc., to introduce reactive halogen functionality along the chain, as branches or as end groups. Low molecular weight polybutadienes (preferably with an average number molecular weight of 500 to 2000) containing terminal allylic chlorine or bromine groups, and low, medium, or high molecular weight polymers having grafted thereto units containing reactive halogen, etc., are exemplary of polymers which have been modified by post-treatments. Also useful in the practice of the invention are any of the above polymers which have been further modified by cross-linking, emulsification, particulation, etc. A particularly desirable form of the polymer is that of a microgel.

As indicated above, the amount of reactive halogen in the backbone polymer can range from a very samll amount, i.e. at least about 0.01 mole % of the units of the backbone polymer up to 100%. Preferably at least 0.1 mole % of the units will contain halogen in at least one of said reactive forms.

The halogen-substituted oxiranes or oxetanes which are used to form the polyether grafts of this invention are cyclic oxides which have 3 or 4 members in the cyclic ring and contain one or more halogen substituents. Exemplary of the halogen-substituted oxiranes (i.e. epoxides) are the haloalkylene oxides such as
    epifluorohydrin,
    epichlorohydrin,
    epibromohydrin,
    epiiodohydrin,
    2-methyl-3-chloro-1,2-epoxypropane,
    1,2-dichloro-3,4-epoxybutane,
    1-chloro-3,4-epoxybutane,
    1-chloro-4,5-epoxypentane,
    1,1-dichloro-2,3-epoxypropane,
    1,1,1-trichloro-2,3-epoxypropane,
    1,1,1-trichloro-3,4-epoxybutane,
    1,1,1-trifluoro-2,3-epoxypropane,
    cis- or trans-1,4-dichloro-2,3-epoxybutane,
    cis- or trans-1,4-dibromo-2,3-epoxybutane,
    cis- or trans-1,4-difluoro-2,3-epoxybutane,
    and the like,
haloalkyl glycidyl ethers such as
    2,2-bis(chloromethyl)ethyl glycidyl ether,
    2-chloroethyl glycidyl ether,
    2-bromoethyl glycidyl ether,
    2-chloro-1-methylethyl glycidyl ether,
    2,2,2-tris(chloromethyl)ethyl glycidyl ether,
    and the like,
haloaryl glydicyl ethers such as
    p-chlorophenyl glycidyl ether, o-chlorophenyl glydicyl ether,
and the like,
haloalkylaryl glycidyl ethers such as
  chloromethylphenyl glycidyl ether,
  chloromethylnaphthyl glycidyl ether,
  and the like.
Exemplary of the halogen-substituted oxetanes are the haloalkyl and haloalkoxy oxetanes such as
  2-chloromethyl oxetane,
  2-β-bromoethyl oxetane,
  2-fluoromethyl oxetane,
  2-trifluoromethyl oxetane,
  2-γ-iodopropyl oxetane,
  2-β-chlorobutyl oxetane,
  2-fluoromethoxy oxetane,
  2-chloromethoxy oxetane,
  2-bromomethoxy oxetane,
  2-iodomethoxy oxetane,
  2-β-chloroethoxy oxetane,
  2-β-bromobutoxy oxetane,
  2-β-fluorooctoxy oxetane,
  2-fluoromethoxy methyl oxetane,
  2-β-chloroethoxy methoxy oxetane,
  2-γ-bromoisopropoxy methyl oxetane,
  2-γ-iodobutoxymethyl oxetane,
  2-γ-fluorohexoxy methyl oxetane,
  2-ω-chlorodecoxy methyl oxetane,
  3-chloromethyl oxetane,
  3-β-bromoethyl oxetane,
  3-β-iodomethyl oxetane,
  3-trifluoromethyl oxetane,
  3-β-iodopropyl oxetane,
  3-β-chlorobutyl oxetane,
  3,3-bis(chloromethyl) oxetane,
  3,3-bis(fluoromethyl) oxetane,
  3,3-bis(iodomethyl) oxetane,
  3,3-bis(bromomethyl) oxetane,
  3-fluoromethoxy oxetane,
  3-chloromethoxy oxetane,
  3-bromomethoxy oxetane,
  3-iodomethoxy oxetane,
  3-β-chloroethoxy oxetane,
  3-ω-bromobutoxy oxetane,
  3-β-fluorooctoxy oxetane,
  3-fluoromethoxy methyl oxetane,
  3-β-chloroethoxy methyl oxetane,
  3-β-bromoisopropoxy methyl oxetane,
  3-ω-iodobutoxy oxetane,
  3-ω-fluorohexoxy methyl oxetane,
  3-ω-chlorodecoxy methyl oxetane,
  and the like.
Mixtures of any of the foregoing halogen-substituted oxiranes or oxetanes can be used as well as mixtures of at least one of the halogen-substituted oxiranes or oxetanes with up to 90%, preferably up to 75% and most preferably up to 50% by weight of one or more monomers which are copolymerizable with the halogen-substituted oxirane or oxetane and are polymerizable by a cationic mechanism. Suitable non-halogen containing comonomers include epoxides, oxetanes and furans.
Exemplary of non-halogen substituted epoxide comonomers are the alkylene oxides such as
  ethylene oxide,
  propylene oxide,
  1-butene oxide,
  cis-2-butene oxide,
  trans-2-butene oxide,
  isobutylene oxide,
  1-hexene oxide,
  and the like,
the cycloaliphatic oxides such as
  cyclohexene oxide,
  vinyl cyclohexene oxide,
  α-pinene epoxide,
  cyclooctene oxide,
  depentene epoxide,
  and the like,
arylalkylene oxides such as
  styrene oxide,
  and the like,
alkenylalkylene oxides such as
  butadiene monoxide,
  and the like,
epoxy ethers such as alkyl glycidyl ethers, as for example,
  methyl glycidyl ether
  ethyl glycidyl ether
  isopropyl glycidyl ether,
  t-butyl glycidyl ether,
  n-hexyl glycidyl ether,
  n-octyl glycidyl ether,
  and the like,
aryl glycidyl ethers, such as
  phenyl glycidyl ether,
  naphthyl glycidyl ether,
  and the like,
unsaturated glycidyl ethers such as the alkenyl glycidyl ethers as for example,
  vinyl glycidyl ether,
  allyl glycidyl ether,
  and the like,
the alkenyl aryl glycidyl ethers such as
  o-allylphenyl glycidyl ether,
  p-crotylphenyl glycidyl ether,
  and the like,
the acetylenically unsaturated epoxides such as the epoxy alkynes containing 5 to 18 carbon atoms and particularly
  1,2-epoxy-4-decyne,
  1,2-epoxy-4-hexyne,
  cis- and trans-5,6-epoxy-8-decyne,
  cis- and trans-5,6-epoxy-2,8-decadiyne,
  and the like,
the heterocyclic epoxides such as
  5,6-epoxy-1,3-dioxepane,
  2-methyl-5,6-epoxy-1,3-dioxepane,
  2-butyl-5,6-epoxy-1,3-dioxepane,
  2,2-dimethyl-5,6-epoxy-1,3-dioxepane,
  3,4-epoxy-tetrahydropyran,
  and the like,
non-halogen substituted oxetanes such as
  oxetane (also known as trimethylene oxide),
  2-methyl oxetane,
  2-ethyl oxetane,
  2-butyl oxetane,
  2-octyl oxetane,
  2-cyclohexyl oxetane,
  2-methoxy oxetane,
  2-ethoxy oxetane,
  2-propoxy oxetane,
  2-hexoxy oxetane,
  2-methoxymethyl oxetane,
  2-butoxymethyl oxetane,
  2-benzyl oxetane,
  2-phenoxy oxetane,
  2-benzyloxymethyl oxetane, 2-allyl oxetane,
2-vinylbenzene oxetane,
2,2-dimethyl oxetane,
2-methoxy-2-methyl oxetane,
2-methallyl-2-methyl oxetane,
2-methyl-3-methyl oxetane,
3-methyl oxetane,
3-butyl oxetane,
3-octyl oxetane,
3-cyclohexyl oxetane,
3-phenyl oxetane,
3-allyl oxetane,
3-methoxy oxetane,
3-hexoxy oxetane,
3-methoxymethyl oxetane,
3-decoxymethyl oxetane,
3,3-dimethyl oxetane,
3,3-diisopropyl oxetane,
3,3dioctyl oxetane,
3-methoxy-3-methyl oxetane,
3-ethoxymethyl-3-methyl oxetane,
3,3-bis(phenoxymethyl) oxetane,
3-vinyl-3-methyl oxetane,
3,3-bis(allyl) oxetane,
2-methyl-3-methyl-4-methyl oxetane,
2-methyl-4-methyl oxetane,
and the like.

Exemplary of non-halogen substituted furans are the tetrahydrofurans such as
tetrahydrofuran, 2-methyltetrahydrofuran,
2,3,4-trimethyltetrahydrofuran,
and the like.

The graft polymers of this invention are prepared by contacting the halogen-containing backbone polymer and the halogen-substituted oxirane or oxetane with at least a catalytic amount of an organoaluminum compound which has been modified by reaction with water, boron trifluoride, phosphorus pentafluoride, or mixtures thereof under polymerization conditions, as for example at a temperature below about 0°C., and preferably below about −15°C. until at least some of the reactive halogens of the backbone polymer are replaced by a graft of a polyether from the oxirane or oxetane monomer. The organoaluminum compound can be any catalytically active organoaluminum compound which has been modified by reaction with water, boron trifluoride and/or phosphorus pentafluoride. Water modified organoaluminum compounds are described in U.S. Pat. Nos. 3,065,188 and 3,135,705. The boron trifluoride and phosphorus pentafluoride modified compounds can be produced by reacting an organoaluminum compound or the organoaluminum-water compound with from about 0.05 to about 3 moles, and preferably from about 0.1 to about 1 mole, of boron trifluoride, phosphorus pentafluoride or mixtures thereof, per mole of aluminum at below about −30°C. Actual conditions will, of course, depend on the organoaluminum compound, diluent, and oxirane or oxetane monomer or mixture of monomers being polymerized. Any desired procedure can be used for modifying the organoaluminum compound. Generally, better results are obtained if the organoaluminum compound and modifier(s) are prereacted and the reaction product added to the polymerization mixture. This can be done in the presence or absence of an inert diluent or mixtures of diluents. Good results can also be obtained by reacting the organoaluminum compound with the modifier(s) in situ. This can be accomplished by adding the specified amount of modifier(s) to the polymer-monomer-diluent mixture and then adding the organoaluminum compound, or the two can be added to the reaction mixture simultaneously. When water is used, the amount will usually be within the range of 0.5 to 1.5 mole of water per mole of aluminum but a ratio of from 0.1:1 to about 2:1 can be used. The preferred organoaluminum compounds are aluminum alkyl compounds, as, for example, a trialkylaluminum, a dialkylaluminum halide, a dialkylaluminum hydride, an alkylaluminum dihydride, etc. The alkyl group of the alkylaluminum compound can be any alkyl, as, for example, methyl, ethyl, isopropyl, butyl, isobutyl, hexyl, octyl, etc. The amount of the catalyst used will depend on the cyclic oxide monomer(s) being polymerized, the conditions being used, etc., but will generally vary from a small catalytic amount up to a large excess, and usually will be within the range of from about 0.2 to 10 mole % based on the oxirane or oxetane monomer. The modified organoaluminum compound can be added all at once, portionwise, or continuously during the reaction.

The reaction process can be carried out in bulk, solution or dispersion and is preferably carried out in an inert diluent which is a liquid under reaction conditions. Usually the process is carried out in the presence of a diluent which is at least a partial solvent for the backbone polymer and the halogen-substituted oxirane or oxetane. Suitable solvents of this type include aliphatic and aromatic diluents and preferably partially halogenated, aliphatic or cycloaliphatic hydrocarbon. Exemplary of the preferred solvents are the partially halogenated hydrocarbon diluents such as methylene chloride, methylene bromide, methyl chloride, ethyl chloride, butyl chloride, isopropyl chloride, 1,1-dichloroethane, 1,2-dichloroethane, 1,1-dibromoethane, 1,1-dichloropropane, 1,1-dichlorobutane, trichloromethane, trifluoromethane, dichlorofluoromethane, chlorodifluoromethane, 1,1-difluoroethane, 1,1-difluoro-1-chloroethane, trichloroethylene, chlorocyclohexane, bromocycylohexane, etc., nonhalogenated hydrocarbon diluents such as methane, ethane, propane, butane, hexane, n-heptane, cyclopentane, cyclohexane, methyl cyclohexane, ethylene, propylene, butene-1, cyclopentene, cyclohexene, benzene, toluene, etc.; fully halogenated, aliphatic or cycloaliphatic hydrocarbons such as carbon tetrachloride, carbon tetrafluoride, chlorotrifluoromethane, dichlorodifluoromethane, fluorotrichloromethane, perchloroethylene, perfluoroethylene, perfluoropropylene, perchloroethane, 1,1,1-trichloro-2,2,2-trifluoroethane, 1,1,2,2-tetrachloro-1,2-difluoroethane, 1,1,2,2-tetrafluoro-1,2-dichloroethane, etc.; halogenated aromatic hydrocarbons such as chlorobenzene, difluorobenzene, dichlorobenzene, etc. Other suitable diluents include carbon disulfide and ethers such as dimethyl ether, diethyl ether, dibutyl ether, dipropyl ether, diisopropyl ether. The amount of diluent employed is, of course, largely a matter of choice but should be sufficient to provide ease of agitation and usually will provide a final polymer solids content of from about 5 to about 30%. The reaction is preferably carried out under conditions of agitation to insure adequate contact of the polymer, monomer(s) and modified organoaluminum compound. Agitation can be effected in any suitable way, as, for example, by using propeller, anchor, blade, cylinder-shaped or otherwise shaped stirrers. The stirrers are generally used in such a way that shearing forces are produced in the reaction vessel. The rate or degree of agitation necessary for achieving intimate contact will, of course, vary depending on such factors as temperature, type of catalyst, concentration of polymer in the diluent, dimensions of the reaction vessel, etc.

The graft polymer can be recovered by any of the usual means. In cases where the graft polymer is present as a dispersion in a diluent, the graft polymer can be recovered by filtration, centrifugation, or any other desired means. In the case of solutions, it is usually preferably to coagulate the graft polymer by addition of alcohol, steam, etc., and then recovering the graft polymer as above. The solutions or dispersions can, of course, also be concentrated by creaming, centrifugation, stripping and any of the other means known in the art. Special techniques such as, for example, treatment with aqueous acid or base to remove catalyst residues or other treatments can be applied as desired.

The properties of the graft polymers of this invention will vary over a wide range extending from hard, tough plastics to soft, rubbery materials. Hence, the graft polymers are suitable for a wide variety of applications. They can be used as such, as solutions or dispersions in a diluent, or as mixtures with any homopolymer or copolymer formed during their preparation. Use applications will, of course, depend on the nature as well as the particular graft polymer involved. For example, grafts of major amounts of the crystalline homo- and copolymers of epichlorohydrin, cis-1,4-dichloro-2,3-epoxybutane, 3,3-bis-chloromethyl oxetane, etc., on elastomeric backbones (cross-linked or not cross-linked) such as chlorinated butyl rubber, poly(chloroprene), chlorinated polybutadiene, chlorinated ethylene-propylene-diene rubbers, etc., give thermoplastics or thermoplastic elastomers of improved impact strength and flame resistance, depending upon the amount of grafting which has occurred. On the other hand, grafts of amorphous homo- or copolymers of halogen-substituted oxiranes and oxetanes on elastomeric backbones can give rubber-like materials depending upon the halogen-substituted oxirane or oxitane and the amount of grafting which has occurred.

The graft polymers of the invention can be used as protective coatings on metal and other substrates, to prepare flame-resistant foams, films, fibers, bottles, etc., to impregnate paper, textile fabrics, etc., as binders for nonwovens, as adhesives, etc. The graft polymers can also be blended with other polymers to give products having unique or special properties such as flame resistance, impact resistance, chemical resistance, low permeability to gases, etc. For improved impact resistance it is particularly desirable to have the graft on a backbone which is in a crosslinked condition such as, for example, a microgel. The graft polymers can also be blended with other materials such as pigments, fillers, fibers, antioxidants, acid-acceptors, stabilizers, plasticizers, etc. The graft polymers in particulate form are particularly useful for coatings applied by powder, static spray or fluid bed techniques. The graft polymers or blends thereof with other polymers can be oriented monoaxially or biaxially to improve mechanical or other properties. Many other applications of these graft polymers will be apparent to those skilled in the art.

The following examples illustrate specific graft polymers of this invention and the synthesis of these graft polymers. All parts and percentages are by weight unless otherwise indicated. The molecular weight of the graft polymers is shown by their Reduced Specific Viscosity (RSV). By the term "Reduced Specific Viscosity" is meant the $\eta sp/c$ determined on a 0.1% solution of the polymer in dimethyl formamide at 50°C. The crystalline melting point of the graft polymer, if given, is determined by differential scanning calorimetry (DSC) and is the temperature at which the last crystallinity disappears. Likewise, the heat of fusion, $\Delta H_f$, if given, is determined by differential scanning calorimetry and is a measure of the heat in calories required to melt one gram of the polymer.

EXAMPLE 1

A reaction vessel fitted with a thermometer and agitator was placed in a trichloroethylene cooling bath and air was removed from the flask and replaced with nitrogen. The vessel was charged with 835 parts of dry methylene chloride and 12.5 parts of dry chlorobutyl rubber having a Mooney viscosity of 55 and containing 1.4 mole % unsaturation and 1.2 weight % of allylic chlorine, dissolved in 650 parts of dry methylene chloride at 50°C. and agitation was started. The temperature of the charge was reduced using dry ice in the surrounding bath and when the temperature reached 0°C. 125 parts of dry ethyl chloride were added. The temperature of the vessel contents was further reduced by lowering the bath temperature and, when the temperature of the flask contents reached −75°C., 25.0 parts of cis-1,4-dichloro-2,3-epoxybutane and then 9.4 parts of 4.4M triisobutylaluminum-water catalyst were added. The temperature was further reduced to −80°C. over 1 hour, and 12 minutes thereafter 100.0 parts of cis-1,4-dichloro-2,3-epoxybutane were added, over a 15 minute period, the reaction temperature gradually increasing to −73.5°C. The temperature was again reduced and maintained at −78°C. to −80°C. for the remainder of the run. The catalyst used in this example was a 4.4M solution of triisobutylaluminum which had been reacted with 0.67 mole of water per mole of aluminum. The catalyst was prepared by diluting commercial triisobutylaluminum with n-heptane to a 0.5M concentration, adding 0.67 mole of water per mole of aluminum dropwise with agitation over a period of 3.5 hours at 0°C., permitting the temperature to rise over 4 hours to 25°C., letting the mixture stand at 25°C. for at least 24 hours and then vacuum distilling off sufficient heptane at 50°C. to give a catalyst concentration of 4.4M with respect to aluminum.

After a total reaction time of 3.5 hours, the reaction was terminated by adding 26 parts of 2N aqueous hydrogen chloride in ethanol and stirring for 15 minutes, following which the mixture was warmed to room temperature and 400 parts of methylene chloride were added. The mixture was washed twice by stirring with 210 parts of 20% aqueous hydrogen chloride for 3 hours, permitting to stand overnight and removing the water layer, and then finally washed with water until neutral. The methylene chloride dispersion so obtained contained a separate rubber-like phase on the surface of the methylene chloride. The dispersion was stirred and warmed to 40°C. and an aliquot (5.7% of the total) was removed and filtered through a 16 mesh screen to remove the large particles of methylene chloride-insoluble material. The filtrate was cooled to 0°C. and refiltered through a 16 mesh screen, no additional large particle, methylene chloride-insoluble material being obtained. The polymer was isolated from the filtrate by adding 0.5% of Irganox 1010 (pentaerythritol tetraester of 3(3,5-di-tert-butyl-4-hydroxyphenyl)propionic acid) and 2.0% of ERL 2774 (diglycidyl ether of bisphenol A) based on dry weight of the polymer to the filtrate, evaporating off the methylene chloride and then drying. The isolated product was 7.7 parts of a white powder having an RSV of 0.43. Chlorine analysis indicated that 72% of the chlorobutyl rubber was present in this fraction and that the product contained 6.6% chlorobutyl rubber. Solubility characteristics indicated that the rubber was bound to polymeric cis-1,4-dichloro-2,3-epoxybutane since chlorobutyl rubber is not soluble in methylene chloride at 0°C.

The large particle, methylene chloride-insoluble material (from the filtration of the aliquot) was worked up by washing three times with warm methylene chloride and then drying. The methylene chloride-insoluble fraction so obtained was 0.186 part of a tough, cloudy rubber containing 3.69% chlorine. The solubility characteristics and chlorine analysis indicated that this fraction was a graft polymer containing 5% of polymeric cis-1,4-dichloro-2,3-epoxybutane.

The methylene chloride-soluble fraction was isolated from the above methylene chloride washings by stripping off the methylene chloride and drying the residue. The product was 0.103 part of a white rubber containing 38.8% chlorine. Solubility characteristics and chlorine analysis indicated that this fraction was a graft polymer containing 78% of polymeric cis-1,4-dichloro-2,3-epoxybutane.

Polymer was isolated from the remainder of the methylene chloride dispersion from which the aliquot was removed by adding an equal volume of methanol, collecting the particles by filtration, washing once with methanol, stabilizing by slurrying in methanol with 0.5% Irganox 1010 and 2.0% ERL 2774 based on dry weight of the polymer and finally drying. The isolated product was 118 parts (90% conversion of the cis-1,4-dichloro-2,3-epoxybutane) of a graft polymer having an RSV of 0.52 and containing 10.0% chlorobutyl rubber.

The latter graft polymer (having an RSV of 0.52) was evaluated as a molding composition by melt blending the graft polymer with an equal amount of crystalline poly(cis-1,4-dichloro-2,3-epoxybutane) having an RSV of 1.1, a melting point of 233°C. and a heat of fusion of 6.5 calories per gram in a Brabender plastograph for 5 minutes at 250°C. and then injecting the blend at 255°C. into a mold at a temperature of 105°C. Impact strength determinations on the molded article and on a control article produced from crystalline poly(cis-1,4-dichloro-2,3-epoxybutane) having an RSV of 0.65 and which did not contain any graft polymer, gave values of 3.2 and 1.9 inch-lb., respectively, indicating that substantial improvement of impact strength was achieved with the graft polymer.

EXAMPLE 2

The general procedure of Example 1 was followed except that in this example the vessel was charged with 0.5 part of the dry chlorobutyl rubber of Example 1 and 66 parts of dry methylene chloride, the charge was warmed to 50°C. to dissolve the rubber annd then cooled directly to −78°C., at which point 0.5 part of cis-1,4-dichloro-2,3-epoxybutane and then 0.38 part of the triisobutyl aluminum-water catalyst were added. After 0.5 hour and then 1 hour of reaction time, additional cis-1,4-dichloro-2,3-epoxybutane was added in the amount of 0.5 and then 4.0 parts, respectively, and the reaction mixture was maintained at −78°C. for a total of 5 hours, after which time the reaction was terminated by adding 4 parts of ethanol. The mixture was diluted with methylene chloride to facilitate stirring and washed twice by stirring with 100 parts of 10% aqueous hydrogen chloride for 2 hours and removing the water layer and then finally washing with water until neutral. Polymer was isolated by adding an equal volume of methanol and collecting the polymer particles by filtration. The particles were washed once with methanol, stabilized by slurrying in methanol with 0.5% of Irganox 1010 and 2.0% of ERL 2774 based on the dry weight of the polymer and then finally drying for 16 hours under vacuum at 100°C. The isolated product was 4.52 parts (81% conversion of the cis-1,4-dichloro-2,3-epoxybutane) of a white powder of a graft polymer having an RSV of 1.1 and containing 11.1% of chlorobutyl rubber.

The graft polymer of this example was evaluated by compression molding at 250°C. into 7 mil film. The film was clear, tough and flexible, did not break when folded and creased and gave a falling weight tensile impact test value of 50 ft.-lb./inch$^2$. A 7 mil control film from poly(cis-1,4-dichloro-2,3-epoxybutane) having an RSV of 1.0 broke when folded and creased under the same conditions and gave an impact test value of about 20 ft.-lb./inch$^2$.

EXAMPLE 3

The procedure of Example 2 was followed except that: the vessel was charged with 2.0 parts of dry polychloroprene (du Pont's neoprene W containing 0.6% of tertiary allylic chloride) dissolved in 132 parts of dry methylene chloride at 50°C.; and then cooled to room temperature; 2.0 parts of cis-1,4-dichloro-2,3-epoxybutane were next charged to the vessel; the mixture was cooled to −50°C. and maintained thereat during the remainder of the run; 0.76 part of catalyst was used; additional cis-1,4-dichloro-2,3-epoxybutane in the amount of 8.0 parts was added once after the termination of 3 hours of reaction time; and the total reaction time at −50°C. was 6 hours. The isolated product was 9.7 parts (74% conversion of cis-1,4-dichloro-2,3-epoxybutane) of a powdered graft polymer having an RSV of 0.55 and containing 21.2% of neoprene W.

Film prepared from the graft polymer according to the procedure of Example 2 gave a high speed tensile impact value of 8 ft.-lb./inch$^2$. A control film from crystalline poly(cis-1,4-dichloro-2,3-epoxybutane) having an RSV of 0.65 gave an impact strength of 2 ft.-lb./inch$^2$.

EXAMPLE 4

The procedure of Example 3 was repeated except that 1.0 part of polychloroprene (du Pont's neoprene WRT containing 0.6% of tertiary allylic chloride) was substituted for the 2.0 parts of neoprene W. The isolated product was 9.95 parts (87% conversion of the cis-1,4-dichloro-2,3-epoxybutane) of a white powdery graft polymer having an RSV of 0.71 and containing 10.3% of neoprene WRT. Film therefrom gave a high speed tensile impact value of 7 ft.-lb./inch$^2$.

EXAMPLE 5

The procedure of Example 4 was repeated except that 2.0 parts of neoprene WRT was used. The isolated product was 10.06 parts of a white powdery graft polymer having an RSV of 0.54 and containing 20.3% neoprene WRT. Film therefrom gave a high speed tensile

EXAMPLE 6

The procedure of Example 3 was followed except that: 1.0 part of dry neoprene WRT was substituted for 2.0 parts of neoprene W; 84 parts of dry methylene chloride and 24.5 parts of n-heptane were used in place of 132 parts of dry methylene chloride; no additional cis-1,4-dichloro-2,3-epoxybutane was added during the reaction; and the reaction was terminated after 5.0 hours at −50°C., at which time the mixture was a colloidal dispersion. The isolated product was 1.50 parts (25% conversion of cis-1,4-dichloro-2,3-epoxybutane) of a strong rubber having an RSV of 0.27 and containing 68% neoprene WRT. The product had a crystalline melting point of 212°C. and a heat of fusion of 1.5 calories/gram.

A control run carried out as above except that no neoprene WRT was present gave a reaction mixture containing large discrete particles of poly(cis-1,4-dichloro-2,3-epoxybutane). The difference in appearance of the reaction mixtures of the control and this example indicated that grafting had occurred in this example.

EXAMPLE 7

The procedure of Example 6 was repeated except that following 5.0 hours at −50°C., the mixture was cooled to −78°c., 1.8 parts of ethyl chloride and 8.0 parts of cis-1,4-dichloro-2,3-epoxybutane were added, and the reaction was continued at −78°C. for a total reaction time of 24 hours. The isolated product was 9.67 parts (84% conversion of cis-1,4-dichloro-2,3-epoxybutane) of a white powdery graft polymer with rubbery characteristics. The polymer an RSV of 0.74 and contained 10.6% of neoprene WRT. Film therefrom gave a high speed tensile impact value of 13 ft.-lb./inch$^2$.

EXAMPLE 8

The procedure of Example 7 was repeated except that 2.0 parts of neoprene WRT were used. The isolated product was 8.8 parts (75% conversion of cis-1,4-dichloro-2,3-epoxybutane) of a somewhat tough, white graft polymer having an RSV of 0.77 and containing 23.3% of neoprene WRT. Film therefrom gave a high speed tensile impact valve of 7 ft.-lb./inch$^2$.

EXAMPLE 9

The procedure of Example 3 was repeated except that: the vessel was charged with 2.0 parts of bromobutyl rubber (Polysar Bromobutyl X2 containing 2.0% of bromine, largely allylic), 34.4 parts of methylene chloride and 49.8 parts of n-heptane and 2.0 parts of cis-1,4-dichloro-2,3-epoxybutane; the temperature was reduced to −78°C. and maintained thereat during the remainder of the run; after 3.5 hours at −78°C., 0.9 part of ethyl chloride and the additional 8.0 parts of cis-1,4-dichloro-2,3-epoxybutane were added; and the reaction was terminated after 6.5 hours of reaction time. The isolated product was 10.4 parts (80% conversion of the cis-1,4-dichloro-2,3-epoxybutane) of a soft white solid graft polymer having an RSV of 0.62 and containing 19.8% of the bromobutyl rubber. Film of this graft polymer was flexible.

EXAMPLE 10

The procedure of Example 9 was repeated except that: the initial charge was 0.5 part of an epichlorohydrin-propylene oxide-glycidyl chloroacetate terpolymer (61/33/6 weight ratio), 66.3 parts of methylene chloride and 5.0 parts of cis-1,4-dichloro-2,3-epoxybutane; one-half of the catalyst was added when the temperature reached −78°C. and the remainder was added 1 hour later; no ethyl chloride and additional cis-1,4-dichloro-2,3-epoxybutane were added; the total reaction time was 19 hours; and the polymer was isolated as follows. Following dilution of the reaction mixture with methylene chloride and washing first with 10% hydrogen chloride and then with water until neutral, the mixture was filtered to recover the methylene chloride-insoluble fraction. The insoluble fraction was washed once with methylene chloride, stabilized with 0.5% of Irganox 1010 and 2.0% of ERL 2774 and dried. The methylene chloride-insoluble fraction was 0.71 part (12.2% conversion of cis-1,4-dichloro-2,3-epoxybutane) of a hard solid graft polymer having an RSV of 0.93 and containing 86% of poly(cis-1,4-dichloro-2,3-epoxybutane) based on chlorine analysis. The methylene chloride-soluble polymer was recovered from the filtrate and washings by adding 0.5% Irganox 1010 and 2.0% ERL 2774, evaporating off the methylene chloride and then drying. The methylene chloride-soluble fraction was 0.68 part (6.1% conversion of cis-1,4-dichloro-2,3-epoxybutane) of a tough adhering film having an RSV of 1.2 and containing 45% of poly(cis-1,4-dichloro-2,3-epoxybutane) based on chlorine analysis. The soluble fraction had by differential scanning calorimetry a heat of fusion of 3.3 calories/gram and a crystalline melting point of 233°C.

EXAMPLE 11

The procedure of Example 10 was repeated except that the initial charge was 0.5 part of an epichlorohydrin-propylene oxide-3-chloroisopropenyl glycidyl ether terpolymer rubber (62/33/5 weight ratio), 66.3 parts of methylene chloride and 5.0 parts of cis-1,4-dichloro-2,3-epoxybutane, and the reaction time was 23 hours. The methylene chloride-insoluble fraction was 0.47 part (8% conversion of the cis-1,4-dichloro-2,3-epoxybutane) of a hard resinous graft polymer having an RSV of 0.76 and containing 80% of poly(cis-1,4-dichloro-2,3-epoxybutane) based on chlorine analysis. By differential scanning calorimetry the insoluble fraction gave a heat of fusion of 7.4 calories/gram and a crystalline melting point of 234°C. The methylene chloridesoluble fraction was 0.45 part of a tough rubber having by differential scanning calorimetry a heat of fusion ($\Delta H_f$) of 1.1 calories/gram and a crystalline melting point of 235°C.

EXAMPLE 12

The procedure of Example 3 was repeated except that an equal amount of 3,3-bis(chloromethyl)oxetane was substituted for the cis-1,4-dichloro-2,3-epoxybutane and the mixture was cooled to −20°C. and maintained thereat during the entire reaction period. The product was 10.5 parts (85% conversion of 3,3-bis(chloromethyl)oxetane) of a white powdery graft polymer having an RSV greater than 1.5 and containing 19.1 % of neoprene W.

Film prepared therefrom by compression molding at 220°C. was tough and had improved impact strength at 0°C. as compared with a film from poly(3,3-bis(-chloromethyl)oxetane) having a comparable RSV.

EXAMPLE 13

The procedure of Example 3 was repeated except that an equal amount of epichlorohydrin was substituted for the cis-1,4-dichloro-2,3-epoxybutane, the reaction mixture was cooled to −30°C. and maintained thereat during the entire reaction period and the total reaction time was 20 hours. The product was 7.0 parts (50% conversion of epichlorohydrin) of a rubbery graft polymer containing 50% of neoprene W.

When the product of this example was blended with an equal amount of neoprene W, the blend, after vulcanization, had improved solvent resistance and heat resistance as compared with vulcanized neoprene W.

EXAMPLE 14

In this example a graft polymer was produced by reacting cis-1,4-dichloro-2,3-epoxybutane with a chlorinated polybutadiene microgel in the presence of the triisobutylaluminumwater catalyst of Example 1.

PREPARATION OF THE MICROGEL

To a vessel equipped with an agitator and containing 790 parts of methanol was added slowly with agitation 200 parts of Polysar Latex PL 710 (a crosslinked polybutadiene latex having a total solids of 59.4% and particle size averaging 1800A.). The precipitate which formed was collected, washed neutral with methanol and then dried in vacuo for 16 hours at room temperature, giving 108.8 parts of purified crosslinked polybutadiene.

A dispersion of 20.0 parts of the purified crosslinked polybutadiene in 1070 parts of pure methylene chloride produced by tumble mixing in the absence of light was charged at room temperature to a 3-neck flask fitted with an agitator and having gas inlet and outlet ports, the inlet port being fitted with a flowmeter and a gas disperser under the methylene chloride. Agitation was commenced and 535 parts of methylene chloride was added while passing nitrogen through the system for 15 minutes, following which time chlorine gas was bubbled through the charge at a rate of 30 cc/min. for 0.5 hour. Nitrogen was again passed through the system and stirring was continued for an additional 0.7 hour following which time 1500 parts of methanol were added slowly. The finely dispersed product was collected, washed twice with methanol, once with a 0.05% methanol solution of Santonox [4,4'-thiobis(3-methyl-6-t-butylphenol)] in an amount to provide about 0.07% of Santanox based on the dry product and then dried at room temperature under vacuum for 16 hours. The product was 22.3 parts of a white powder of chlorinated polybutadiene microgel containing 10.3% chlorine.

PREPARATION OF GRAFT POLYMER

A reaction vessel was charged with 2.00 parts of the chlorinated polybutadiene microgel produced above and 133.8 parts of dry methylene chloride and tumbled overnight under a nitrogen atmosphere to give a fine dispersion, following which time 2.0 parts of cis-1,4-dichloro-2,3-epoxybutane was added with agitation and the temperature of the vessel contents was reduced using a cooling bath. When the temperature reached −78°C., 0.76 part of the 4.4M triisobutyl aluminum −0.67 water catalyst of Example 1 was added. After 1 hour at −78°C., 0.9 part of ethyl chloride and 8.0 parts of cis-1,4-dichloro-2,3-epoxybutane were added and the reaction mixture was maintained at −78°C. for a total of 26 hours, after which time the reaction was terminated by adding 4 parts of ethanol, and the product was worked up following the procedure of Example 2. The isolated product was 10.2 parts (82% conversion of cis-1,4-dichloro-2,3-epoxybutane) of a graft polymer having an RSV of 1.1 (based on the dimethylformamide-soluble portion, 26% of the polymer being insoluble) and containing 19.5% of chlorinated polybutadiene.

The graft polymer was compression molded at 24°C. and gave a tough, flexible film.

EXAMPLE 15

A graft polymer was prepared according to the procedure of Example 14 except that 84 parts of methylene chloride and 24.6 parts of n-heptane were substituted for the 133.8 parts of methylene chloride. The isolated product was 9.2 parts (72% conversion of cis-1,4-dichloro-2,3-epoxybutane) of a graft polymer having an RSV of 0.76 (based on soluble fraction, 7.2% being insoluble in dimethylformamide) and containing 21.7% of chlorinated polybutadiene.

EXAMPLE 16

A graft polymer was produced according to the procedure of Example 14 except that a butadiene/p-chloromethyl styrene copolymer (90/10) microgel was substituted for the chlorinated polybutadiene microgel and a mixture of 98% cis-1,4-dichloro-2,3-epoxybutane and 2% of trans-1,4-dichloro-2,3-epoxybutane was used in place of the cis-1,4-dichloro-2,3-epoxybutane.

The microgel used in this example was produced by copolymerizing a 90:10 mixture of butadiene and p-chloromethyl styrene (prepared according to the method of C. L. Arcus and N. S. Salomons, J. Chem. Soc. 1515, 1962) in an SBR-type emulsion polymerization system to high conversion, precipitating the copolymer with methanol, collecting and washing the precipitate with methanol and then drying at room temperature under vacuum for 16 hours.

The isolated product was 11.0 parts (90% conversion of cis-1,4-dichloro-2,3-epoxybutane) of a graft polymer having an RSV of 0.9 and containing 18.2% of the butadiene/p-chloromethylstyrene copolymer. Film prepared therefrom according to the procedure of Example 2 was tough and flexible.

What I claim and desire to protect by Letters Patent is:

1. A process for producing a graft polymer comprising contacting a halogen-containing polymer wherein at least 0.01 mole % of the units of the polymer contain at least one reactive halogen on a tertiary carbon atom or on a primary or secondary carbon atom alpha to an aromatic ring, to a carbon-to-carbon double bond or to a carbon-to-oxygen double bond with at least one halogen substituted oxirane or oxetane selected from the group consisting of haloalkylene oxides, haloalkyl glycidyl ethers, haloaryl glycidyl ethers, haloalkyl oxetanes and haloalkoxy oxetanes in the presence of a catalytic amount of an organoaluminum compound which has been modified by reaction with at least one of the group consisting of water, boron trifluoride and phosphorus pentafluoride under polymerization conditions at a temperature below about 0°C. until a graft of a polyether derived from said oxirane of oxetane has replaced at least one of said reactive halogens of the halogen-containing polymer.

2. The process of claim 1 wherein the organoaluminum compound is trialkylaluminum which has been modified by reaction with 0.5 to 1.5 mole of water per mole of aluminum.

3. The process of claim 2 wherein the halogen-substituted oxirane comprises cis-1,4-dichloro-2,3-epoxybutane.

4. The process of claim 3 wherein the halogen-containing polymer is a halogenated hydrocarbon polymer.

5. The process of claim 4 wherein the halogenated hydrocarbon polymer is chlorobutyl rubber.

6. The process of claim 2 wherein the halogen-substituted oxirane is epichlorohydrin and the halogen-containing polymer is polychloroprene.

7. Graft polymers comprising a halogen-containing polymer backbone chain wherein at least 0.01 mole % of the units of the polymer backbone chain contain at least one reactive halogen on a tertiary carbon atom or on a primary or secondary carbon atom alpha to an aromatic ring, to a carbon-to-carbon double bond or to a carbon-to-oxygen double bond and wherein a graft of a polyether derived from at least one halogen-substituted oxirane or oxetane selected from the group consisting of haloalkylene oxides, haloalkyl glycidyl ethers, haloaryl glycidyl ethers, haloalkyl oxetanes and a haloalkoxy oxetanes has replaced at least one of said reactive halogens of the polymer backbone chain.

8. The graft polymer of claim 7 wherein the halogen-substituted oxirane comprises cis-1,4-dichloro-2,3-epoxybutane.

9. The graft polymer of claim 8 wherein the backbone chain is a halogenated hydrocarbon polymer.

10. The graft polymer of claim 9 wherein the halogenated hydrocarbon polymer is chlorobutyl rubber.

11. The graft polymer of claim 8 wherein the halogen-substituted oxirane is epichlorohydrin and the backbone chain is polychloroprene.

12. The process of claim 3 wherein the halogen-containing polymer is a polymer of a halodiene.

13. The graft polymer of claim 8 wherein the backbone chain is a polymer of a halo-diene.

14. The process of claim 12 wherein the polymer of a halo-diene is polychloroprene.

15. The graft polymer of claim 13 wherein the polymer of a halo-diene is polychloroprene.

* * * * *